US010518336B2

(12) United States Patent
Koga et al.

(10) Patent No.: US 10,518,336 B2
(45) Date of Patent: Dec. 31, 2019

(54) DRILL AND METHOD OF MANUFACTURING MACHINED PRODUCT USING THE SAME

(71) Applicant: KYOCERA Corporation, Kyoto-shi, Kyoto (JP)

(72) Inventors: Kenichirou Koga, Dongguan (CN); Hirokazu Hatano, Moriyama (JP)

(73) Assignee: KYOCERA CORPORATION, Kyoto (JP)

(*) Notice: Subject to any disclaimer, the term of this patent is extended or adjusted under 35 U.S.C. 154(b) by 0 days.

(21) Appl. No.: 15/528,179

(22) PCT Filed: Nov. 13, 2015

(86) PCT No.: PCT/JP2015/081979
§ 371 (c)(1),
(2) Date: May 19, 2017

(87) PCT Pub. No.: WO2016/080305
PCT Pub. Date: May 26, 2016

(65) Prior Publication Data
US 2017/0326652 A1    Nov. 16, 2017

(30) Foreign Application Priority Data

Nov. 21, 2014   (JP) ................................. 2014-236438

(51) Int. Cl.
*B23B 51/02*   (2006.01)
(52) U.S. Cl.
CPC ........ *B23B 51/02* (2013.01); *B23B 2251/043* (2013.01); *B23B 2251/046* (2013.01);
(Continued)

(58) Field of Classification Search
CPC ................ B23B 51/02; B23B 2251/40; B23B 2251/408; B23B 2251/402;
(Continued)

(56) References Cited

U.S. PATENT DOCUMENTS 750,537 A * 1/1904 Hanson .................... B23B 51/02
                                              408/230
4,222,690 A * 9/1980 Hosoi ...................... B23B 51/02
                                              407/54
(Continued)

FOREIGN PATENT DOCUMENTS

EP      0549548 A1    6/1993
EP      0790092 A1    8/1997
(Continued)

OTHER PUBLICATIONS

Machine translation, Japan patent document, JP2003048110 (A), inventor Kawade et al., Feb. 18, 2003.*
(Continued)

*Primary Examiner* — Eric A. Gates
*Assistant Examiner* — Chwen-Wei Su
(74) *Attorney, Agent, or Firm* — Volpe and Koenig, P.C.

(57) ABSTRACT

A drill according to an embodiment includes a bar-shaped drill body extending along a rotation axis, a cutting edge located at a front end of the drill body, and a first flute extending spirally from the cutting edge toward a rear end of the drill body. The first flute includes a first region which is located close to the front end and has a helix angle θ1, and a second region which is located closer to the rear end than the first region and has a helix angle θ2 smaller than the helix angle θ1. The second region includes an elongated protruding part along the first flute.

12 Claims, 16 Drawing Sheets

(52) U.S. Cl.
CPC ... *B23B 2251/402* (2013.01); *B23B 2251/406* (2013.01); *B23B 2251/408* (2013.01); *Y10T 408/9097* (2015.01)

(58) Field of Classification Search
CPC ........ B23B 2251/404; B23B 2251/406; B23B 2251/043; B23B 2251/046; B23B 2251/48; Y10T 408/9097; Y10T 408/97; Y10T 408/909
See application file for complete search history.

(56) References Cited

U.S. PATENT DOCUMENTS

| | | | |
|---|---|---|---|
| 5,312,209 A | | 5/1994 | Lindblom |
| 5,478,176 A | * | 12/1995 | Stedt ................ B23B 51/02 408/229 |
| 5,800,101 A | | 9/1998 | Jindai et al. |
| 5,807,039 A | * | 9/1998 | Booher ............... B23B 51/02 408/224 |
| 6,213,692 B1 | * | 4/2001 | Guehring ............ B23B 51/02 408/144 |
| 6,652,203 B1 | * | 11/2003 | Risen, Jr. ............ B23B 51/02 408/225 |
| 9,039,336 B2 | * | 5/2015 | Von Puttkamer ....... B23B 51/02 408/144 |
| 2005/0135887 A1 | * | 6/2005 | Borschert ........... B23B 51/02 408/230 |
| 2012/0039680 A1 | * | 2/2012 | Koike ................. B23B 51/02 408/1 R |

FOREIGN PATENT DOCUMENTS

| | | |
|---|---|---|
| JP | 05-253717 A | 10/1993 |
| JP | 09-277108 A | 10/1997 |
| JP | 2003-048110 A | 2/2003 |

OTHER PUBLICATIONS

International Search Report, PCT/JP2015/081979, dated Jan. 26, 2016, 2 pgs.

* cited by examiner

DRILL AND METHOD OF MANUFACTURING MACHINED PRODUCT USING THE SAME

TECHNICAL FIELD

The present embodiment relates to a drill used for a cutting process, and a method of manufacturing a machined product.

BACKGROUND ART

As a drill used for a cutting process of a workpiece, such as a metal member, a drill described in Japanese Unexamined Patent Publication No. 9-277108 (Patent Document 1) has conventionally been known. The drill described in Patent Document 1 includes a helical flute having an intermediate part in which a flute width gradually increases from a front end of the drill toward a rear end thereof and a helix angle gradually decreases. In the drill described in Patent Document 1, a chip flow distance is short because the helix angle of the helical flute becomes smaller toward the rear end.

Even with the use of the drill described in Patent Document 1, however, there has been the likelihood that chip clogging occurs on the rear end having a relatively large width of the helical flute and a relatively small helix angle. The following can be considered as a cause for this. The force to carry away chips becomes weaker as the helix angle decreases. While a rear end side of the helical flute is made up of a single recessed curved line shape in a cross section orthogonal to a rotation axis. The chips flow along the recessed curved line, and therefore a contact area between the chips and the helical flute increases. Hence, the chip clogging is apt to occur on the rear end side of the helical flute.

The present embodiment has been made in view of the above problem, and aims at providing a drill capable of good discharging chips.

SUMMARY OF THE INVENTION

A drill according to an embodiment includes a bar-shaped drill body extending along a rotation axis, a cutting edge located at a front end of the drill body, and a first flute extending spirally from the cutting edge toward a rear end of the drill body. The first flute includes a first region which is located close to the front end and has a helix angle θ1, and a second region which is located closer to the rear end than the first region and has a helix angle θ2 smaller than the helix angle θ1. The second region includes an elongated protruding part along the discharge flute.

EMBODIMENTS FOR CARRYING OUT THE INVENTION

Figure 1:
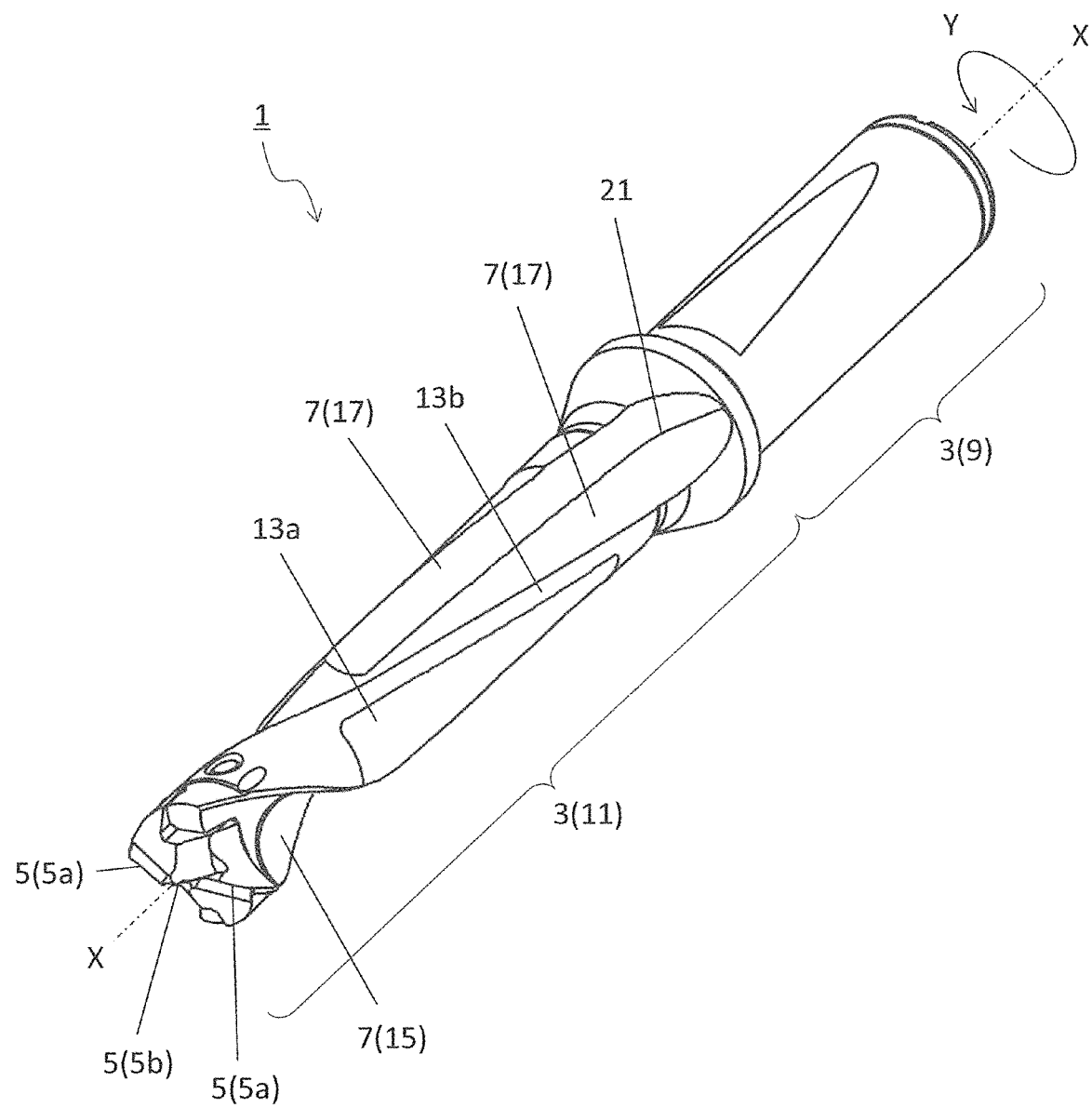
FIG. 1 is a perspective view that shows a drill according to a first embodiment.

Drills respectively according to first and second embodiments are described in detail below with reference to the drawings. For the sake of description, the drawings referred to in the following show, in a simplified form, only main members from among members constituting each of these embodiments. Hence, the drills of the present invention are capable of including any optional structural member not shown in the drawings referred to in the present description. Sizes of the members in each of the drawings are not ones which faithfully represent the actual structural members and size ratios of these members.

<Drill>

As shown in FIG. 1, the drill 1 of the first embodiment includes a drill body 3 (hereinafter also referred to as "the body 3"), a cutting edge 5, and a pair of first flutes 7 (hereinafter referred to as "the discharge flutes 7").

As shown in FIG. 1 and FIGS. 3 to 5, the body 3 has a rotation axis X and is made into a bar shape extending along the rotation axis X. The body 3 rotates around the rotation axis X during a cutting process of a workpiece for manufacturing a machined product. The body 3 of the present embodiment includes a holding section 9 and a cutting section 11. The holding section 9 is the section which is configured to be held by, for example, a spindle to be rotated in a machine tool (not shown), and which is designed according to the shape of the spindle of the machine tool. The cutting section 11 is the section which includes a portion that is located close to a front end of the holding section 9 and is brought into contact with the workpiece, and which has a main role in the cutting process of the workpiece. Arrow Y in FIGS. 1 and 2 indicates a rotation direction of the body 3 around the rotation axis X.

Figure 6:
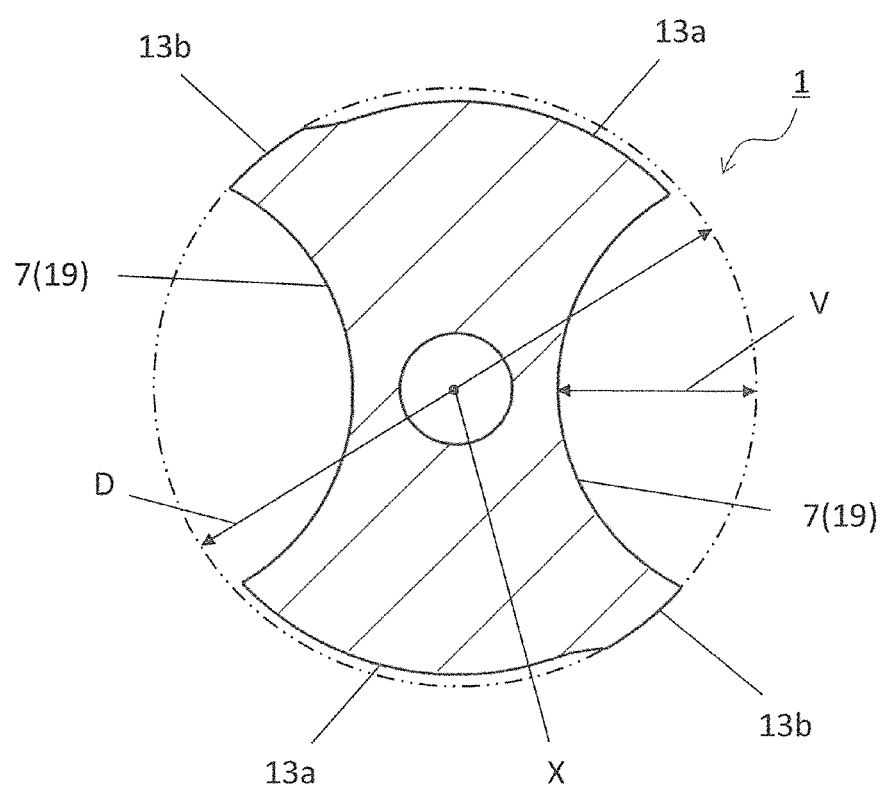
FIG. 6 is a sectional view taken at D1 in the drill shown in FIG. 3.

The cutting section 11 in the present embodiment has a shape obtained by excluding portions corresponding to the pair of discharge flutes 7 and a clearance 13a from a column extending along the rotation axis X as shown in, for example, FIG. 6. Therefore, in a cross section orthogonal to the rotation axis X, portions of an outer periphery of the cutting section 11 which corresponds to a margin 13b and the like, except for the pair of discharge flutes 7 and the clearance 13a, have a circular arc shape located on an identical circle. A diameter of the identical circle corresponds to an outer diameter of the cutting section 11.

In the drill 1 of the present embodiment, for example, the outer diameter of the cutting section 11 is settable to 6-42.5 mm. The drill 1 of the present embodiment is settable to L=3D to 12D, in which L is a length of an axis (a length of the cutting section 11), and D is a diameter (the outer diameter of the cutting section 11).

As a material for the body 3, there are, for example, cemented carbide containing WC (tungsten carbide) and containing Co (cobalt) as a binder; alloys obtained by incorporating additives, such as TiC (titanium carbide) or TaC (tantalum carbide) into the cemented carbide; and metals, such as stainless steel and titanium.

Figure 2:
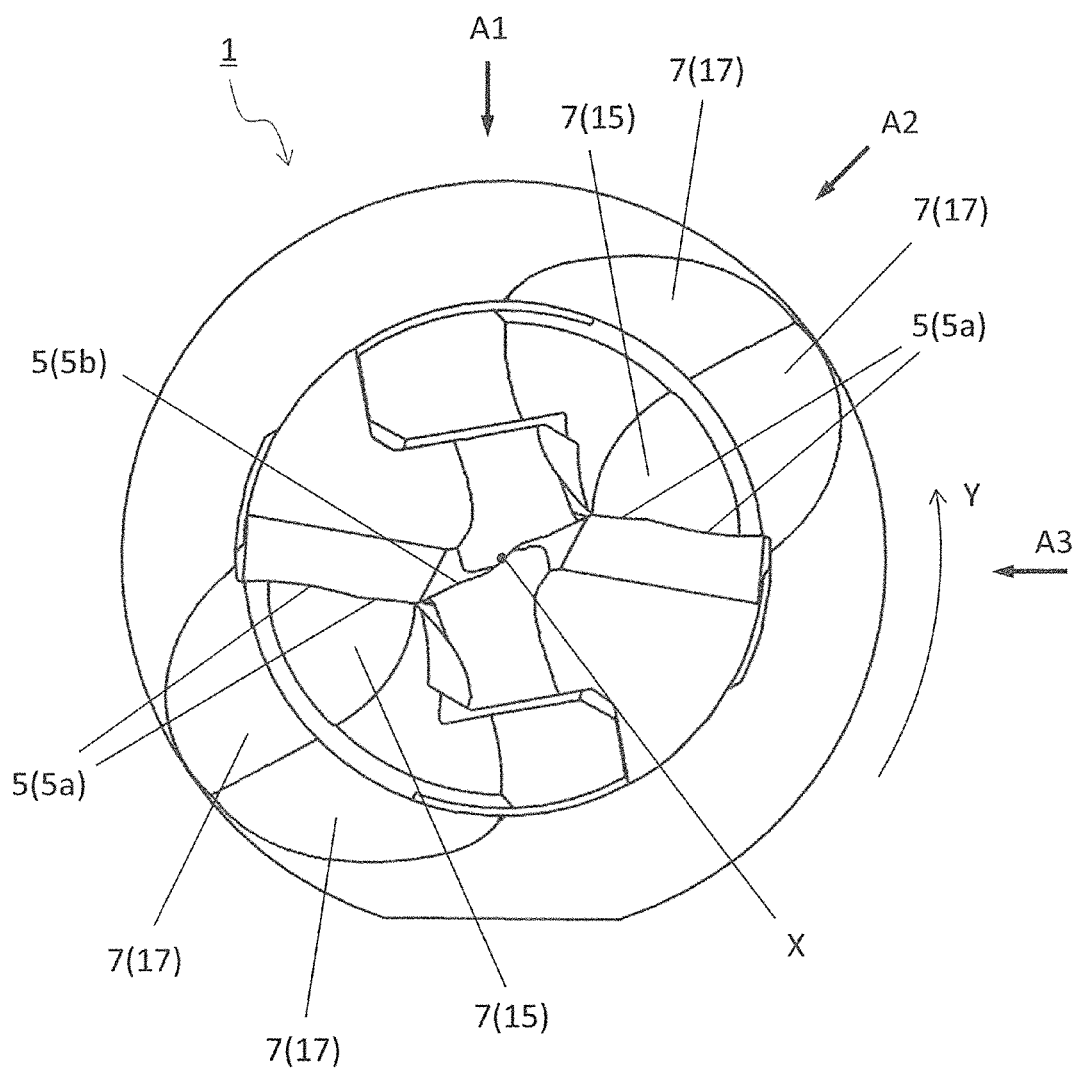
FIG. 2 is a front view taken from the direction of a front end in the drill shown in FIG. 1.

The drill 1 has the cutting edge 5 located at a front end of the body 3. The cutting edge 5 is a part for cutting a workpiece. As shown in FIG. 2, the cutting edge 5 in the present embodiment is made up of a pair of major cutting edges 5a and a minor cutting edge 5b. The pair of major cutting edges 5a and the minor cutting edge 5b are disposed at the front end of the body 3, namely, a front end part of the cutting section 11. The minor cutting edge 5b is intersected with the rotation axis X when the body 3 is viewed from the front end thereof. The minor cutting edge 5b in the present embodiment functions as so-called chisel edge. Although the cutting edge 5 includes the pair of major cutting edges 5a in the present embodiment, there is no problem with including only one major cutting edge 5a.

The pair of major cutting edges 5a is respectively connected to both end portions of the minor cutting edge 5b and extended from both ends of the minor cutting edge 5b toward an outer periphery of the body 3 in a front end view. Cutting of the workpiece is carried out with the pair of major cutting edges 5a and the minor cutting edge 5b. When the minor cutting edge 5b is used as the chisel edge, a chisel angle is settable to, for example, approximately 130-170°. Here, the term "front end view" denotes a front view of the body 3 from the front end side thereof along the rotation axis X as shown in FIG. 2.

The pair of major cutting edges 5a in the present embodiment has a recessed curvilinear shape in the front end view as shown in FIG. 2. This makes it easier to curl chips generated by the pair of major cutting edges 5a, thus facilitating discharge of the chips through the pair of discharge flutes 7. When the body 3 is cut by a virtual plane including the rotation axis X, a rotation locus of each of the pair of major cutting edges 5a is so disposed as to incline with respect to the rotation axis X in order to enhance cutting performance. An inclination angle of the pair of major cutting edges 5a with respect to the rotation axis X is settable to approximately 50-85°.

The pair of major cutting edges 5a is located away from each other with the minor cutting edge 5b interposed therebetween as shown in FIG. 2. The pair of major cutting edges 5a has rotational symmetry of 180° around the rotation axis X of the body 3 when viewed from the front end side (front side). Since the pair of major cutting edges 5a has the rotational symmetry as described above, it is possible to decrease blur that can occur between the pair of major cutting edges 5a when the pair of major cutting edges 5a bites against the workpiece. Accordingly, a stable drilling process is performable.

The pair of discharge flutes 7 extends from the cutting edge 5 toward a rear end of the body 3 on the outer periphery of the cutting section 11 in the body 3 as shown in FIG. 1. The pair of discharge flutes 7 extends spirally around the rotation axis X. In the present embodiment, the pair of discharge flutes 7 respectively extends spirally from the pair of major cutting edges 5a in the cutting edge 5 toward the rear end of the body 3. In the present embodiment, a region of the cutting edge 5 which connects to the pair of discharge flutes 7 corresponds to the pair of major cutting edges 5a, and a region of the cutting edge 5 which is connected by the pair of major cutting edges 5a corresponds to the minor cutting edge 5b. In order to stably hold the body 3 by the machine tool, the pair of discharge flutes 7 in the present embodiment is disposed only at the cutting section 11 but not disposed at the holding section 9.

The pair of discharge flutes 7 is primarily intended to discharge the chips generated by the pair of major cutting edges 5a and the minor cutting edge 5b to the outside. During the cutting process, the chips generated by one of the major cutting edges 5a is discharged toward the rear end of the body 3 through one of the discharge flutes 7 which connects to the one of the major cutting edges 5a. The chips generated by another of the major cutting edges 5a is discharged toward the rear end of the body 3 through one of the discharge flutes 7 which connects to the another of the major cutting edges 5a. In order to individually, discharge the chips respectively generated by the major cutting edges 5a well, an arrangement is made to establish overlapping between one of the discharge flutes 7 in the present embodiment and another one when the another one is rotated 180° around the rotation axis X.

Figure 3:
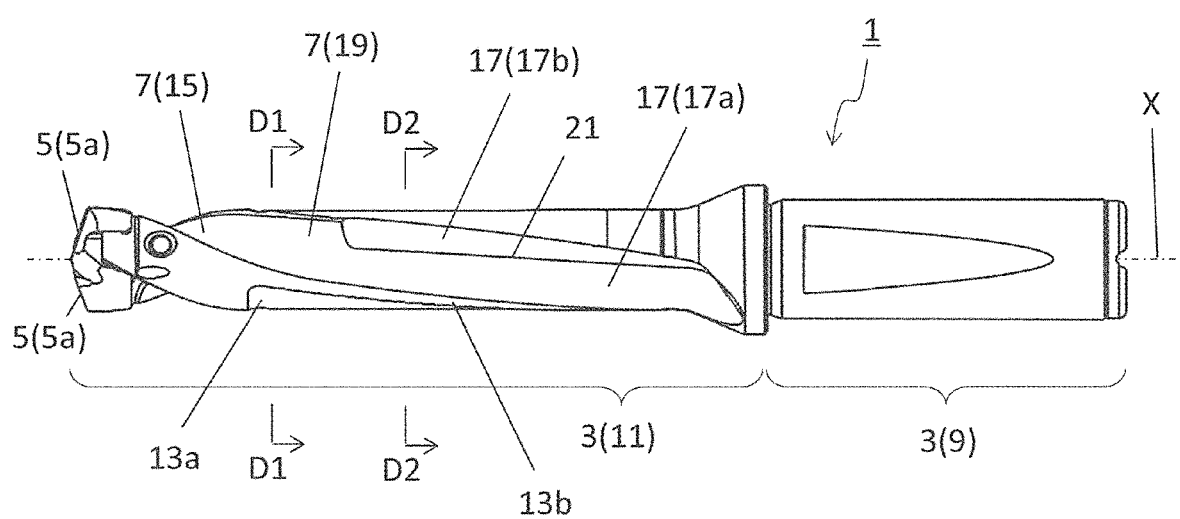
FIG. 3 is a side view taken from A1 direction in the drill shown in FIG. 2.
Figure 4:
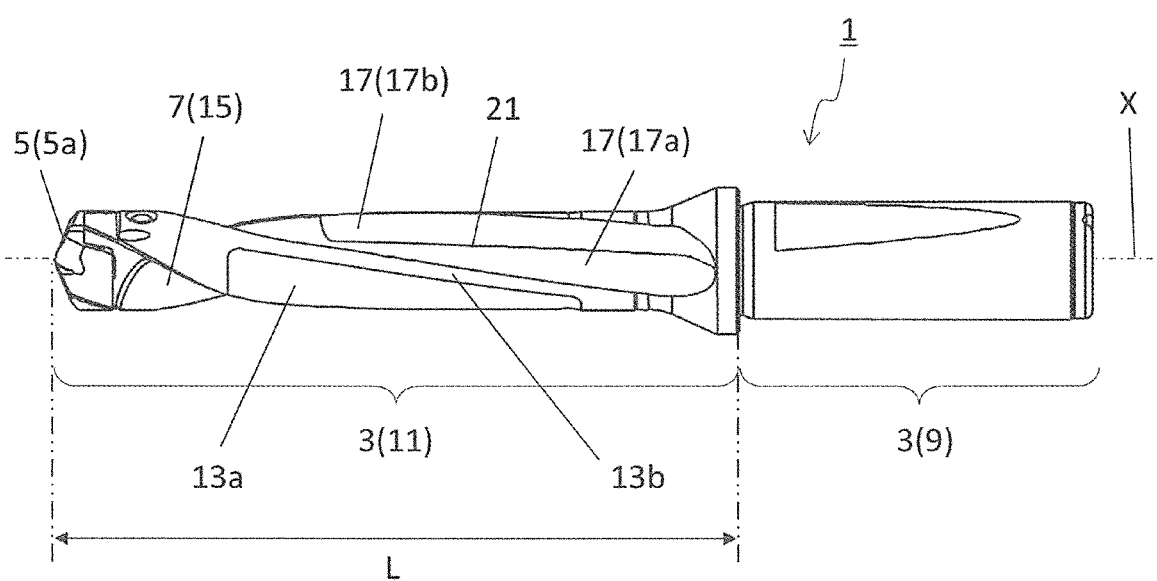
FIG. 4 is a side view taken from A2 direction in the drill shown in FIG. 2.
Figure 5:
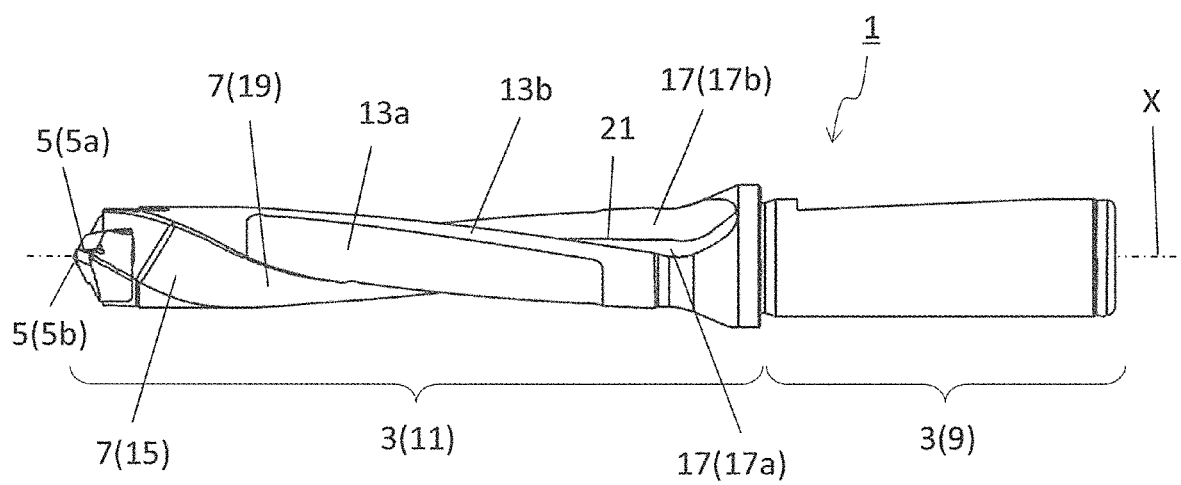
FIG. 5 is a side view taken from A3 direction in the drill shown in FIG. 2.

As shown in FIGS. 3 to 5, the pair of discharge flutes 7 in the present embodiment respectively includes a first region 15 and a second region 17. The first region 15 is located close to the front end in the discharge flute 7 and connects to the major cutting edge 5a. The second region 17 is located closer to the rear end than the first region 15. A connection region 19 that connects the first region 15 and the second region 17 is disposed therebetween. In other words, each of the discharge flutes 7 is made up of the first region 15, the connection region 19, and the second region 17.

Figure 9:
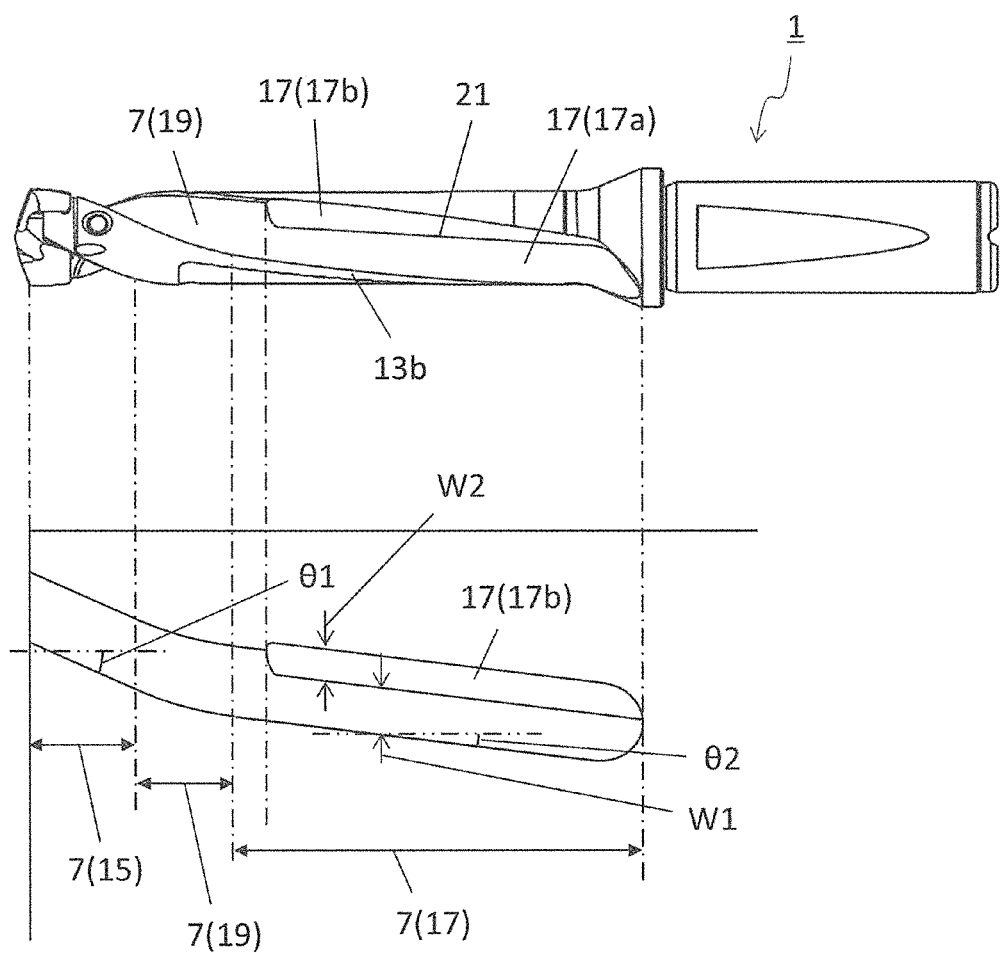
FIG. 9 is a developed view that shows an outline of a first flute in the drill shown in FIG. 1.

As shown in FIG. 9, the first region 15 has a helix angle $\theta 1$, and the second region 17 has a helix angle $\theta 2$ smaller than the helix angle $\theta 1$ in the first region 15. The helix angles are respectively constant in the first region 15 and the second region 17. Because the connection region 19 connects the first region 15 and the second region 17, a helix angle of the connection region 19 changes from $\theta 1$ to $\theta 2$ as going from the front end toward the rear end.

The discharge flute 7 may not have the connection region 19, however, when the discharge flute 7 has the connection region 19 as in the case of the present embodiment, chip clogging is less apt to occur. Specifically, the first region 15 and the second region 17 are different in helix angle, and therefore a chip flow direction may change between these two regions. However, the chip clogging is less apt to occur because the connection region 19 smoothly connecting the first region 15 and the second region 17 is disposed therebetween.

The helix angle in the present embodiment denotes an angle formed by a leading edge of land and a virtual straight line parallel to the rotation axis X. The leading edge of land is indicated by an intersection line formed by the discharge flute 7 and the margin 13b located on a rear side in a rotation direction Y of the rotation axis X relative to the discharge flute 7.

When it is difficult to perform an evaluation using the leading edge of land, an evaluation may be performed in the following manner. An intersection line is determined which is formed by the discharge flute 7 and a clearance 13a located on a front side in the rotation direction Y of the rotation axis X relative to the discharge flute 7, and an angle formed by the discharge flute 7 and a virtual straight line that passes through one point on the intersection line and is parallel to the rotation axis X is evaluated as a helix angle.

The first region 15 in the present embodiment is located close to the front end in the discharge flute 7 so as to connect to the major cutting edge 5a. Therefore, the chips cut by the major cutting edge 5a are deliverable immediately toward the rear end of the cutting section 11 without remaining near the major cutting edge 5a.

Each of the discharge flutes 7 in the present embodiment includes the second region 17 located closer to the rear end than the first region 15. The chips immediately delivered from the first region 15 are further deliverable toward the rear end of the cutting section 11. Additionally, because the second region 17 has a relatively small helix angle $\theta 2$, it is possible to enhance rigidity of the body 3 compared to the case where the helix angle $\theta 2$ has the same value as the helix angle $\theta 1$.

The helix angle $\theta 1$ is settable to, for example, approximately 15-45°. The helix angle $\theta 2$ needs to be a smaller value than the helix angle $\theta 1$, and is settable to, for example, approximately 3-20°.

The second region 17 in the present embodiment has an elongated protruding part 21 along the discharge flute 7. The term "along the discharge flute 7" denotes a state in which, similarly to the discharge flute 7 extending spirally around the rotation axis X, the elongated protruding part 21 extends spirally around the rotation axis X from the front end side toward the rear end side in the second region 17.

Thus, the second region 17 does not form the single recessed curvilinear shape, but the elongated protruding part 21 along the discharge flute 7 is formed on a bottom part of the second region 17. Hence, the chips are easy to separate from the second region 17 in the elongated protruding part 21. This makes it possible to decrease a contact area between the chips and the discharge flute 7 in a region of the discharge flute 7 which has a relatively small helix angle. Consequently, the chip clogging is less apt to occur in the region.

The term "bottom part" in the present embodiment denotes not being an opening part of the discharge flute 7 which is adjacent to the clearance 13a and the margin 13b. That is, the bottom part is not limited to a part of the discharge flute 7 which has a maximum depth.

The second region 17 of the discharge flute 7 in the present embodiment includes a second flute 17a and a third flute 17b. The elongated protruding part 21 is located at a boundary between the second flute 17a and the third flute 17b. Accordingly, the second flute 17a and the third flute 17b also extend spirally around the rotation axis X.

When the second region 17 is made up of the second flute 17a and the third flute 17b which are disposed side by side and the elongated protruding part 21 is located between these two flutes, it is easy to form the elongated protruding part 21 in the step of forming the discharge flutes 7.

In the drill 1 of the present embodiment, the second flute 17a in the second region 17 is continuous with the connection region 19, and the third flute 17b in the second region 17 is located away from the connection region 19.

The helix angle of the discharge flute 7 is $\theta 1$ in the first region 15 and changes from $\theta 1$ to $\theta 2$ in a direction from the front end toward the rear end of the body 3 in the connection region 19. The chip flow direction also changes accordingly to the change in helix angle. Therefore, behavior of chips may be apt to become unstable at a location at which the chip flow direction changes.

However, the third flute 17b in the second region 17 is located away from the connection region 19, and the elongated protruding part 21 is located away from the connection region 19 in the present embodiment. Therefore, the chips that have reached the second region 17 firstly flows only along the second flute 17a, and hence the chip flow direction in the second region 17 can be made stable in the second flute 17a. This makes it easier to stabilize the behavior of the chips that have reached the second region 17.

In the drill 1 of the present embodiment, the third flute 17b is located along the second flute 17a on the front side in the rotation direction Y of the rotation axis X relative to the second flute 17a. In other words, the third flute 17b is disposed between the second flute 17a in the first region 15 and the clearance 13a located on the front side in the rotation direction Y of the rotation axis X relative to the second flute 17a.

When the third flute 17b is disposed along the second flute 17a on the front side in the rotation direction Y of the rotation axis X, it is possible to further reduce the likelihood that the chips come into contact with the third flute 17b, thereby further enhancing chip discharge performance.

One reason for this is the fact that the chips are relatively apt to be pressed against the rear side in the rotation direction Y in the discharge flute 7. When the third flute 17b is disposed along the second flute 17a on the front side in the rotation direction Y of the rotation axis X, the chips are apt to be pressed against the second flute 17a located on the rear side in the rotation direction Y. The chips are less apt to be pressed against the third flute 17b located on the front side in the rotation direction Y. Accordingly, the chips are far less apt to come into contact with the third flute 17b.

The second flute 17a and the third flute 17b have the recessed curvilinear shape in the cross section orthogonal to the rotation axis X. The chips flow along the second flute 17a, and the flow of the chips can be made smooth because the second flute 17a has the recessed curvilinear shape. Similarly to the first region 15, the third flute 17b has the recessed curvilinear shape. Therefore, even when chips come into contact with the third flute 17b, the chip clogging is less apt to occur in the third flute 17b.

In the present embodiment, the second flute 17a and the third flute 17b respectively have circular arc shapes with the same radius of curvature in the cross section orthogonal to the rotation axis X. A smoother chip flow is attainable because the second flute 17a and the third flute 17b have the circular arc shape. The chip clogging is far less apt to occur in the third flute 17b because the radius of curvature of the third flute 17b is the same as the radius of curvature of the second flute 17a. In the present embodiment, the second flute 17a and the third flute 17b have line symmetry with respect to the elongated protruding part 21 in the cross section orthogonal to the rotation axis X.

In the present embodiment, because the second region 17 is made up of the second flute 17a and the third flute 17b, the elongated protruding part 21 can be located between the second flute 17a and the third flute 17b while making the surface of the second region 17 into the circular arc shape.

When manufacturing the drill 1, the second flute 17a and the third flute 17b can be formed under the same processing condition because the second flute 17a and the third flute 17b have the circular arc shape with the same radius of curvature. It is therefore easier to manufacture the drill 1.

Having the same radius of curvature does not require that the radii of curvature are strictly identical. There is no problem even when there is a slight difference of approximately 5% between the radius of curvature of the second flute 17a and the radius of curvature of the third flute 17b.

In the discharge flutes 7 in the present embodiment, a boundary between the second flute 17a and the third flute 17b in the second region 17 corresponds to the elongated protruding part 21 in the cross section orthogonal to the rotation axis X. That is, the second region 17 made up of the second flute 17a and the third flute 17b does not form the single recessed curvilinear shape in the cross section orthogonal to the rotation axis X, and the elongated protruding part 21 protruding outward is disposed along the boundary between the second flute 17a and the third flute 17b.

If the second region 17 forms the single recessed curvilinear shape, the chips may be apt to flow while coming into contact with both of the second flute 17a and the third flute 17b. Consequently, the chip clogging may be apt to occur because of the increased area of portions of the second region 17 with which the chips come into contact.

However, because the elongated protruding part 21 is located between the second flute 17a and the third flute 17b, chips flowing along the second flute 17a are separated from the discharge flute 7 at the elongated protruding part 21, and the chips become easier to separate from the third flute 17b and flow away from the third flute 17b. It is therefore possible to decrease the area of portions of the second region 17 with which the chips come into contact. Since the chips flow away from the third flute 17b, it is possible not only to decrease the contact area but also to permit play between the chips and the discharge flute 7. Therefore, the chip clogging is less apt to occur, and the chip discharge performance is improved.

Similarly to the second flute 17a, the third flute 17b extends spirally around the rotation axis X. When the helix angle of the third flute 17b has the same value as the helix angle θ2 of the second flute 17a, it is possible to permit play between the chips and the second region 17 without excessively enlarging the third flute 17b. It is also possible to enhance strength of the body 3 because the third flute 17b is formed without being excessively enlarged. A flute width W1 of the second flute 17a is larger than a flute width W2 of the third flute 17b in the present embodiment.

Figure 10:
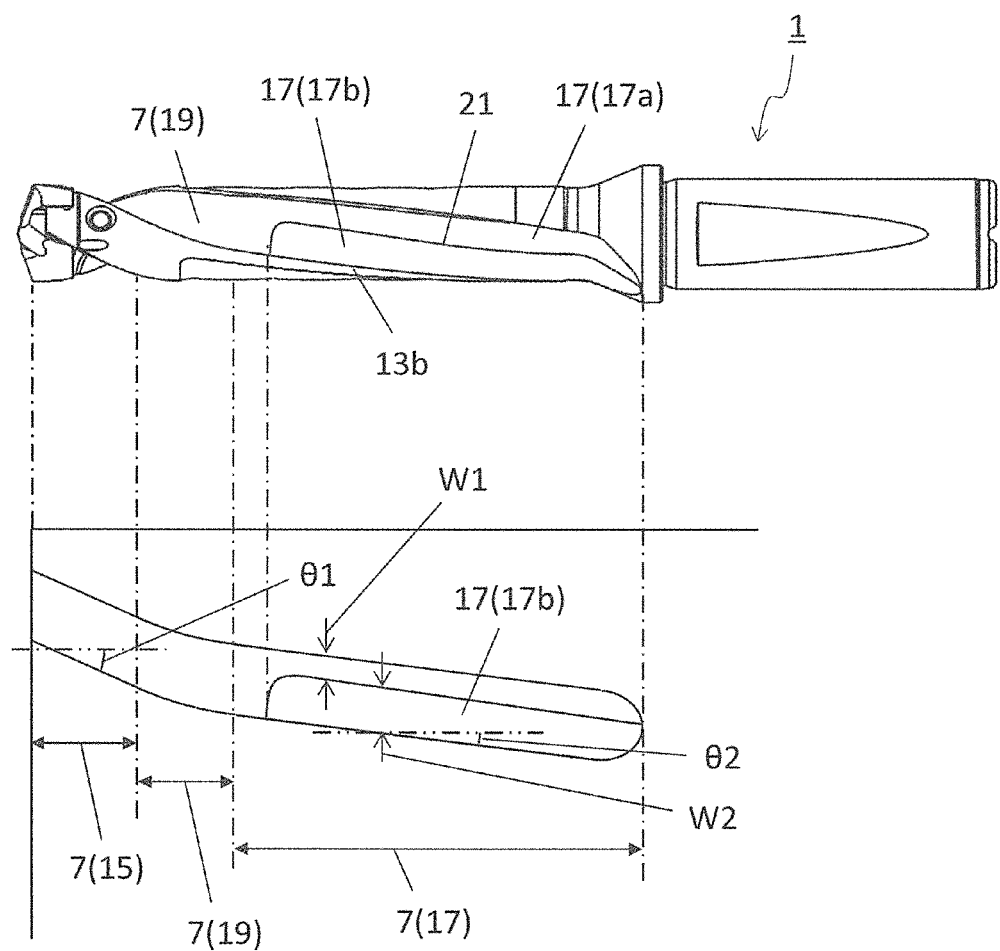
FIG. 10 is a developed view that shows an outline of a first flute in a first modification of the drill shown in FIG. 1.

Although the third flute 17b is preferably disposed along the second flute 17a on the front side in the rotation direction Y of the rotation axis X as is the case with the present embodiment, the third flute 17b is not limited to this configuration. For example, as shown in FIG. 10, the third flute 17b may be disposed along the second flute 17a on the rear side in the rotation direction Y of the rotation axis X. In other words, the third flute 17b may be disposed between the second flute 17a in the first region 15 and the margin 13b located on the rear side in the rotation direction Y of the rotation axis X relative to the second flute 17a. In a modification shown in FIG. 10, an intersection line of the margin 13b and the third flute 17b becomes a leading edge of land.

In the drill 1 of the present embodiment shown in FIG. 9, the chips flowing along the second flute 17a become easy to separate from the second region 17 at the elongated protruding part 21 located between the second flute 17a and the third flute 17b, and then flow forward away from the third flute 17b. In the drill 1 of the modification shown in FIG. 10, because the flute width W2 of the third flute 17b is larger than the flute width W1 of the second flute 17a, the chips flowing along the third flute 17b become easy to separate from the second region 17 at the elongated protruding part 21 and then flow forward away from the second flute 17a. Similarly to the drill 1 shown in FIG. 9, it is therefore possible to decrease the area of portions of the second region 17 with which the chips come into contact. Since the chips flow forward away from the second flute 17a, it is possible not only to decrease the contact area but also to permit play between the chips and the second region 17. Consequently, the chip clogging is less apt to occur, thus leading to improved chip discharge performance.

Here, FIG. 10 is a first modification of the drill 1 of the embodiment shown in FIG. 1, and is a developed view in the first modification corresponding to a developed view shown in FIG. 9. In FIGS. 9 and 10, the left side of each of the drawings corresponds to the front end side of the drill 1, and the right side thereof corresponds to the rear end side of the drill 1. A direction from bottom to top in the drawings corresponds to the rotation direction Y.

The elongated protruding part 21 in the present embodiment is configured as a convex-shaped region formed along a boundary portion between the concave-shaped second flute 17a and the concave-shaped third flute 17b in the cross section orthogonal to the rotation axis X. As a specific example of the elongated protruding part 21, there are, for example, the configuration of a convex curvilinear region formed between the concave-shaped second flute 17a and the concave-shaped third flute 17b, and a precipitous region formed by the intersection of the recessed curvilinear second flute 17a and the recessed curvilinear third flute 17b.

Figure 8:
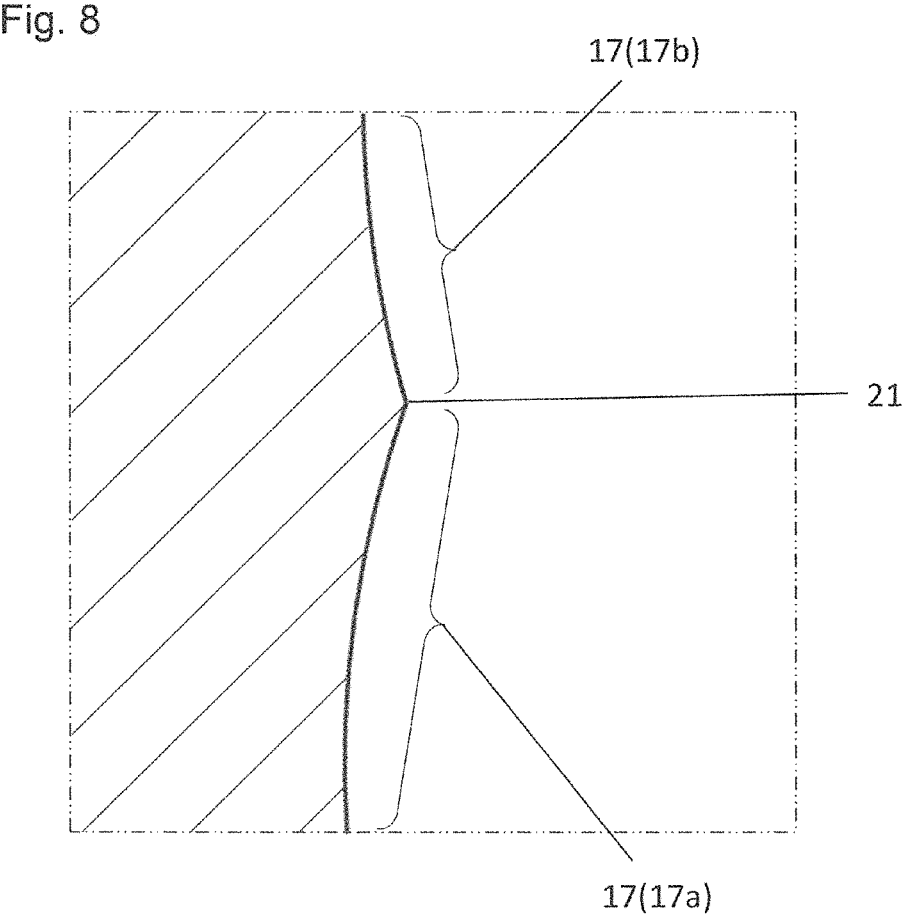
FIG. 8 is an enlarged view of a region B1 in the drill shown in FIG. 7.
Figure 11:
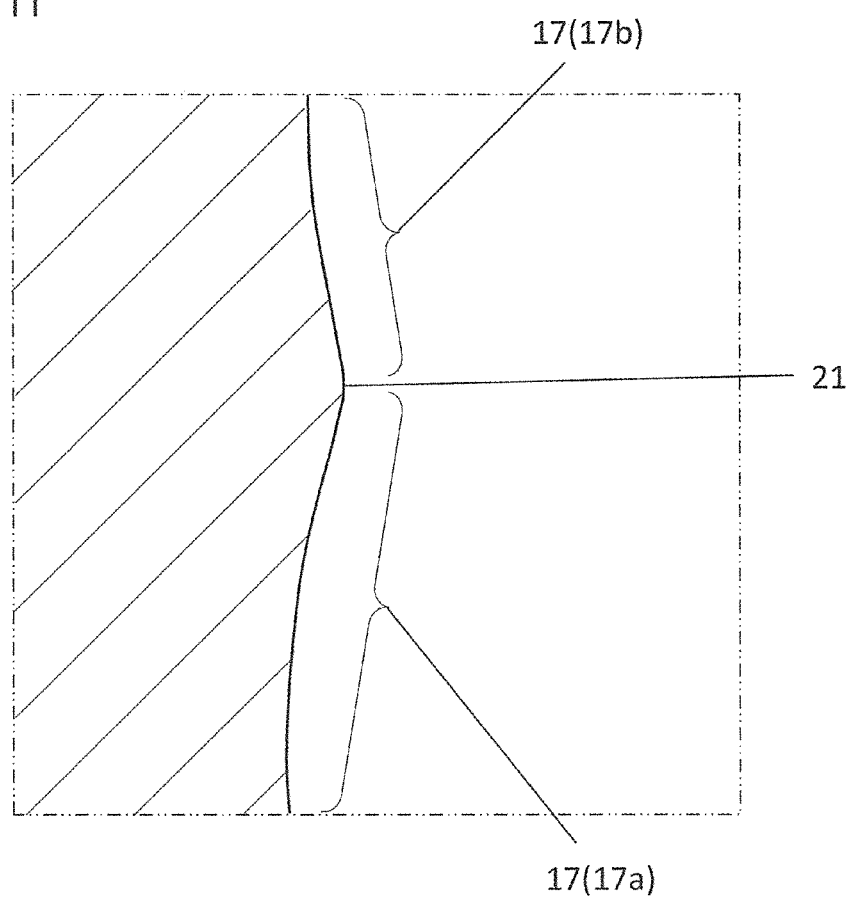
FIG. 11 is an enlarged sectional view that shows a second modification of the drill shown in FIG. 8.

FIG. 11 shows a second modification of the drill 1 of the present embodiment shown in FIG. 1, and is a sectional view in the second modification corresponding to the enlarged sectional view shown in FIG. 8.

In particular, the elongated protruding part 21 preferably has the precipitous shape formed by the intersection of the second flute 17a and the third flute 17b as in the case of the present embodiment. When a boundary part between the second flute 17a and the third flute 17b has a precipitous shape by the intersection of the second flute 17a and the third flute 17b, the chips flowing along the second flute 17a are easy to separate from the third flute 17b, thus making it easier to decrease the area of the surface of the third flute 17b with which the chips come into contact.

A depth V of the discharge flute 7 is settable to approximately 10-40% of the outer diameter of the cutting section 11. Here, the depth V of the discharge flute 7 denotes a value obtained by subtracting a distance between a bottom of the discharge flute 7 and the rotation axis X from a radius of the body 3 in the cross section orthogonal to the rotation axis X as shown in FIG. 6. The term "bottom" denotes a portion of the discharge flute 7 which is closest to the rotation axis X.

Therefore, a web thickness indicated by a diameter of an inscribed circle in the cross section orthogonal to the rotation axis X in the body 3 is settable to approximately 20-80% of the outer diameter of the cutting section 11. Specifically, when the outer diameter D of the cutting section 11 is 20 mm, the depth V of the discharge flute 7 is settable to approximately 2-8 mm.

Figure 7:
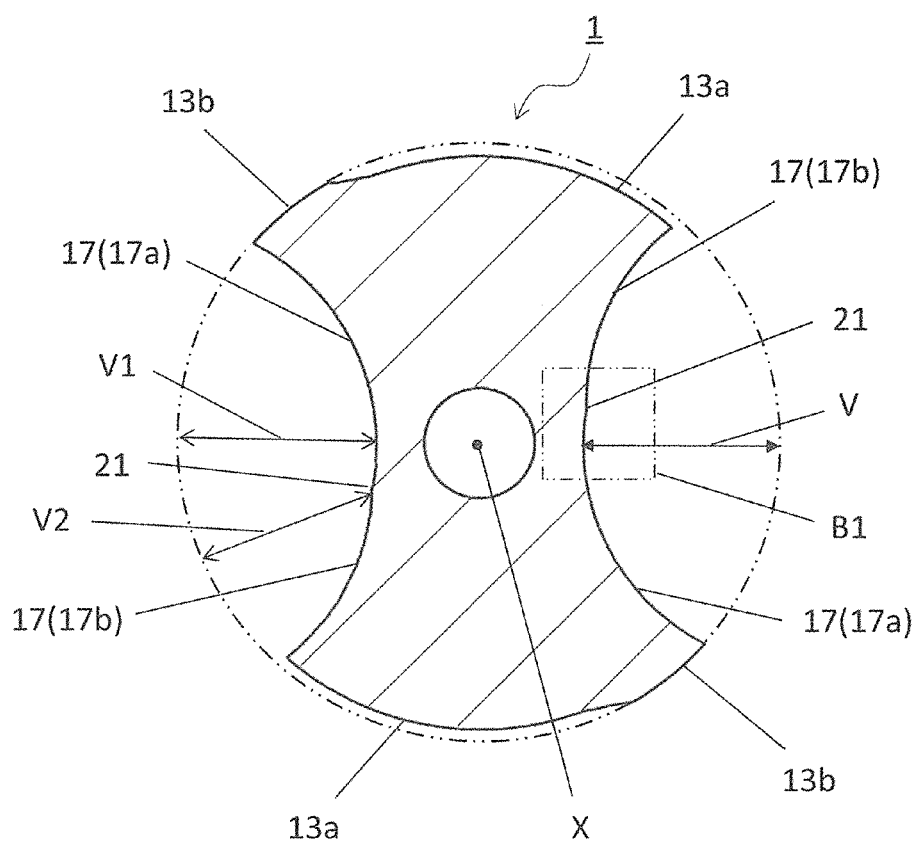
FIG. 7 is a sectional view taken at D2 in the drill shown in FIG. 3.

In the drill 1 of the present embodiment, as shown in FIG. 7, a depth V2 of the third flute 17b is smaller than a depth V1 of the second flute 17a in the cross section orthogonal to the rotation axis X. Accordingly, a large web thickness is ensured while permitting play between the chips and the third flute 17b. This leads to the drill 1 compatibly having good chip discharge performance and good durability.

Moreover, the first region 15 and the second flute 17a have the same depth. When the first region 15 and the second flute 17a, along which chips flow, do not have the same depth and the depth of the discharge flute 7 changes in these regions, the chip flow may be apt to be disrupted at portions having a small depth. However, when the first region 15 and the second flute 17a have the same depth, the chip flow can be made stable while increasing the web thickness on the rear end side of the cutting section 11.

Additionally, the depth of the first region 15 in the discharge flute 7 is constant from the front end toward the rear end. The configuration that the depth of the first region 15 is constant does not mean that the depth is strictly constant from the front end toward the rear end. The depth of the first region 15 may have variations of approximately 5%. FIG. 6 illustrates the depth of the first region 15.

The depths of the second flute 17a and the third flute 17b, from which chips are discharged outside, may be gradually decreased at their rear ends. FIG. 7 illustrates the depths of the second flute 17a and the third flute 17b.

In the drill 1 of the present embodiment, a length of the second region 17 in a direction parallel to the rotation axis X is larger than a length of the first region 15 in a direction parallel to the rotation axis X. During a cutting process, a load generated during the cutting process may be applied to the drill 1, and the cutting section 11 may be warped.

More specifically, a middle part of the cutting section 11 is apt to warp greatly than a front end part thereof and a rear end part thereof. However, durability of the cutting section 11 against warping can be improved because the length of the second region 17, which has a relatively small helix angle and high rigidity, in the direction parallel to the rotation axis X is ensured to be relatively longer than that of the first region 15.

In the drill 1 of the present embodiment, the length of the first region 15 in the direction parallel to the rotation axis X is set to approximately 10-20% of a length of the entire discharge flute 7 in the direction parallel to the rotation axis X. The length of the second region 17 in the direction parallel to the rotation axis X is set to approximately 60-80% of the length of the entire discharge flute 7 in the direction parallel to the rotation axis X. The discharge flute 7 in the present embodiment has the connection region 19. Therefore, a total of the length of the first region 15 and the length of the second region 17 does not reach 100% of the length of the entire discharge flute 7 in the direction parallel to the rotation axis X.

A drill of a second embodiment is described in detail below with reference to the drawings.

Figure 12:
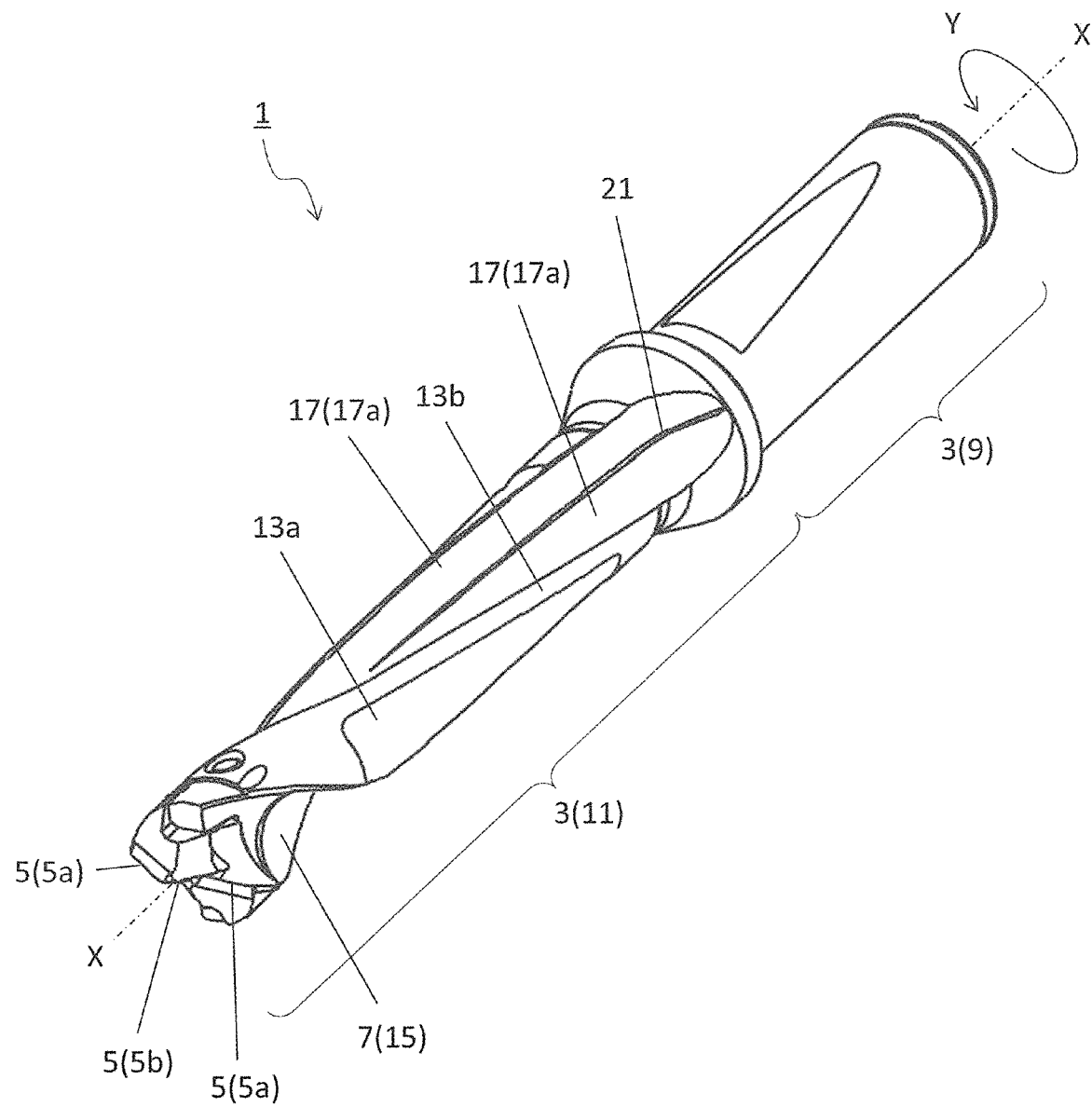
FIG. 12 is a perspective view that shows a drill according to a second embodiment.
Figure 13:
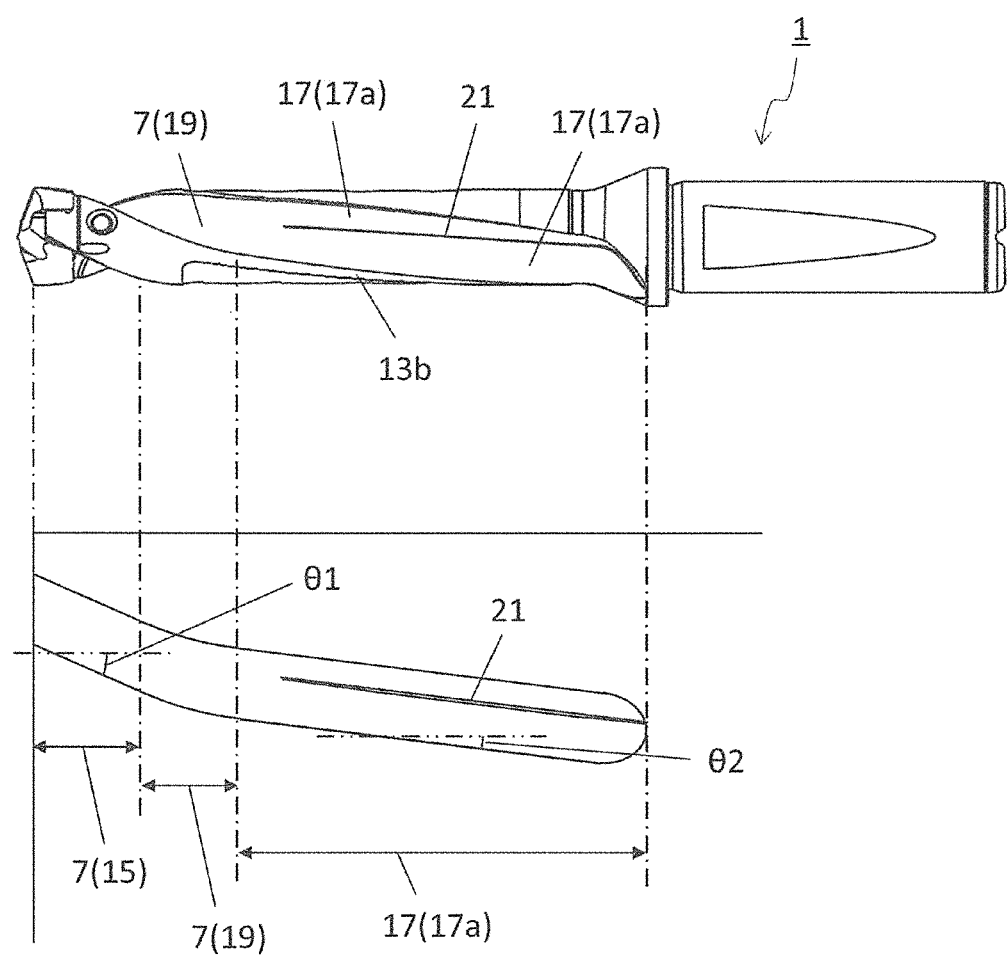
FIG. 13 is a developed view that shows an outline of a first flute in the drill shown in FIG. 12.

As shown in FIGS. 12 and 13, similarly to the drill of the first embodiment, the drill 1 of the second embodiment includes a drill body 3 (body 3), a cutting edge 5, and a pair of discharge flutes 7. The drill of the second embodiment differs from the drill of the first embodiment in the following points. These points are described in detail below, and the descriptions of configurations similar to those of the drill of the first embodiment are omitted.

Similarly to the drill of the first embodiment, the drill 1 of the present embodiment has a first region 15 and a second region 17. Similarly to the drill of the first embodiment, the drill 1 of the present embodiment includes an elongated protruding part 21 along the discharge flute 7, which is disposed on a bottom part of the second region 17. The drill 1 of the present embodiment differs from the first embodiment in that the second region 17 is made up of only one flute instead of two flutes.

Chips flowing forward on the rear side in the rotation direction Y relative to the elongated protruding part 21 in the second region 17 separate from the discharge flute 7 at the elongated protruding part 21 in the second region 17. Therefore, the chips are easy to flow forward separately on the rear side in the rotation direction Y relative to the elongated protruding part 21 in the second region 17. Consequently, the chip clogging is less apt to occur and chip discharge performance is improved as is the case with the drill 1 of the first embodiment.

In the drill 1 of the present embodiment, a flute width of the second region 17 is larger than a flute width of the first region 15. It is therefore possible to ensure a region on the front side in the rotation direction Y relative to the elongated protruding part 21 while ensuring a large region on the rear side in the rotation direction Y relative to the protruding part 21 that is the region in which the chips flow forward in the section region 17. This permits sufficient play between the chips and the region in the second region 17 which is located on the front side in the rotation direction Y relative to the elongated protruding part 21.

The elongated protruding part 21 in the drill of the present embodiment may be formed by, for example, forming the second region 17, and then connecting a member that becomes the elongated protruding part 21 to the second region 21. Alternatively, the elongated protruding part 21 may be formed concurrently with the formation of the second region 17.

<Method of Manufacturing Machined Product>

A method of manufacturing a machined product according to an embodiment is described in detail below by exemplifying the case of using the drill 1 of the foregoing first embodiment. The method is described below with reference to FIGS. 14 to 16. The rear end part of the holding section in the drill 1 is omitted in FIGS. 14 to 16.

The method of manufacturing a machined product according to the present embodiment includes the following steps (1) to (4).

Figure 14:
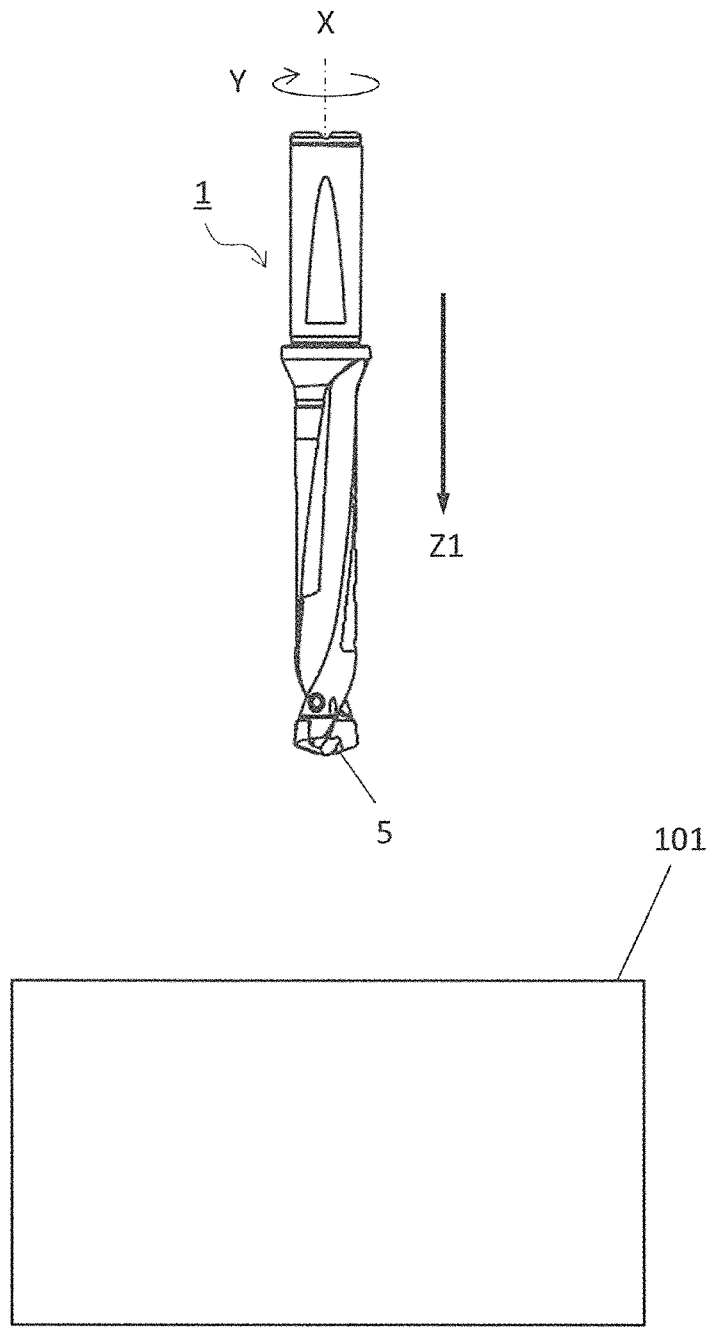
FIG. 14 is a perspective view that shows a step in a method of manufacturing a machined product according to an embodiment.

(1) This is the step of disposing the drill 1 above a prepared workpiece 101 (refer to FIG. 14).

Figure 15:
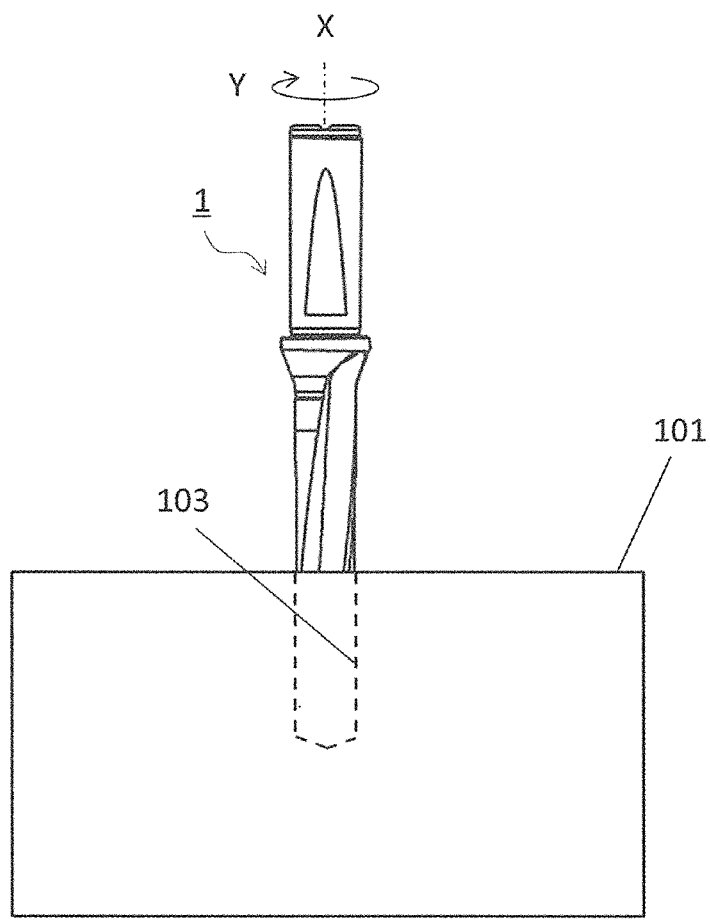
FIG. 15 is a perspective view that shows a step in the method of manufacturing a machined product according to the embodiment.

(2) This is the step of bringing the drill 1 near the workpiece 101 in direction Z1 by rotating the drill 1 in an arrowed direction Y around the rotation axis X (refer to FIGS. 14 and 15).

This step may be carried out by, for example, fixing the workpiece 101 onto a table of a machine tool having the drill 1 attached thereto, and then bringing the drill 1 being rotated near the workpiece 101. In this step, the workpiece 101 and the drill 1 need to be brought near each other. For example, the workpiece 101 may be brought near the drill 1.

(3) This is the step of forming a drilled hole 103 (through hole) in the workpiece 101 by bringing the drill 1 nearer the workpiece 101 so that the cutting edge of the drill 1 being rotated are brought into contact with a desired position of a surface of the workpiece 101 (refer to FIG. 15).

In this step, from the viewpoint of obtaining a good machined surface, it is preferable to make a setting so that a partial region of the cutting section of the drill 1 which is close to the rear end thereof does not penetrate the workpiece 101. That is, fine chip discharge performance is producible via the partial region by making the partial region function as a region for discharging chips.

Figure 16:
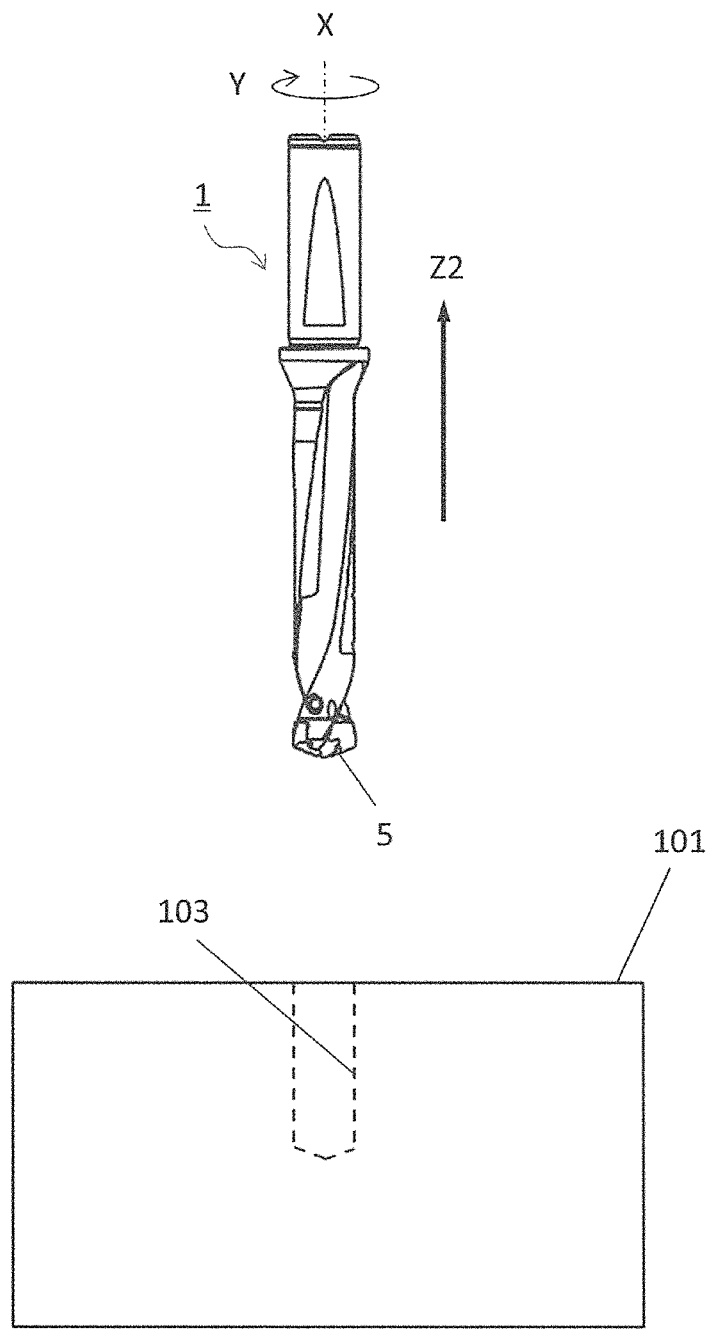
FIG. 16 is a perspective view that shows a step in the method of manufacturing a machined product according to the embodiment.

(4) This is the step of separating the drill 1 from the workpiece 101 in direction Z2 (refer to FIG. 16).

Also in this step, the workpiece 101 and the drill 1 need to be kept away from each other as is the case with the above step (2). For example, the workpiece 101 may be separated from the drill 1.

The machined product having the drilled hole 103 is obtainable through the foregoing steps.

When the cutting process of the workpiece 101 as described above is carried out a plurality of times, for example, when a plurality of drilled holes 103 are formed in the single workpiece 101, it is necessary to repeat the step of bringing the cutting edge of the drill 1 into contact with different locations of the workpiece 101 while keeping the drill 1 rotating.

While the several embodiments of the present invention have been described and illustrated above, the present invention is not limited thereto. It is, of course, possible to make any optional ones insofar as they do not depart from the gist of the present invention.

Alternatively, the drill 1 may have such a structure that a part of the cutting section 11 which includes the front end thereof is attachable to/detachable from a part close to the rear end thereof. Still alternatively, the drill 1 may have such a structure that the cutting section 11 is made up of a single member.

DESCRIPTION OF REFERENCE NUMERALS 1 drill
3 drill body (body)
5 cutting edge
5a major cutting edge
5b minor cutting edge
7 first flute (discharge flute)
9 holding section
11 cutting section
13a clearance
13b margin
15 first region
17 second region
17a second flute
17b third flute
19 connection region
21 elongated protruding part
101 workpiece
103 drilled hole
θ1, θ1 helix angle

The invention claimed is:

1. A drill, comprising:
a bar-shaped drill body extending along a rotation axis;
a cutting edge located at a front end of the drill body; and
a first flute extending spirally from the cutting edge toward a rear end of the drill body,
wherein the first flute comprises
a first region which is located close to the front end and has a first helix angle;
a second region which is located closer to the rear end than the first region and has a second helix angle smaller than the first helix angle;
a connection region located between the first region and the second region and connected to the first region and the second region; and
an elongated protruding part that
is located on the second region,
is not located on the first region, and
is not located on the connection region.

2. The drill according to claim 1, wherein the second region comprises
a second flute located behind the elongated protruding part in a rotational direction of the rotation axis, and
a third flute located ahead of the elongated protruding part in the rotational direction,
the elongated protruding part is a boundary between the second flute and the third flute, and
the second flute is connected to the connection region and the third flute is separated from the connection region.

3. The drill according to claim 2, wherein a depth of the third flute is smaller than a depth of the second flute in a cross section orthogonal to the rotation axis.

4. The drill according to claim 2, wherein a depth in the first region and a depth in the second flute are equal to each other in a cross section orthogonal to the rotation axis.

5. The drill according to claim 2, wherein each of the second flute and the third flute has a recessed curvilinear shape in a cross section orthogonal to the rotation axis.

6. The drill according to claim 5, wherein the second flute and the third flute have line symmetry with respect to the elongated protruding part in a cross section orthogonal to the rotation axis.

7. The drill according to claim 2, wherein a width of the second flute is larger than a width of the third flute.

8. The drill according to claim 1, wherein a width of the second region is larger than a width of the first region.

9. The drill according to claim 1, wherein
the second region comprises a second flute and a third flute, and
the elongated protruding part is a boundary between the second flute and the third flute.

10. A method of manufacturing a machined product, comprising:
rotating a drill according to claim 1 around the rotation axis;
bringing the cutting edge of the drill being rotated into contact with a workpiece; and
separating the drill from the workpiece.

11. A drill, comprising:
a bar-shaped drill body extending along a rotation axis;
a cutting edge located at a front end of the drill body; and
a first flute extending spirally from the cutting edge toward a rear end of the drill body,
wherein the first flute comprises:
a first region which is located close to the front end and has a first helix angle;
a second region which is located closer to the rear end than the first region and has a second helix angle smaller than the first helix angle;
a connection region located between the first region and the second region and connected to the first region and the second region; and
an elongated protruding part that is located on the second region and is not located on both the first region and the connection region,
wherein a helix angle of the connection region changes from the first helix angle to the second helix angle as going from a front end of the connection region to a rear end of the connection region, and
wherein the second region comprises:
a second flute located behind the elongated protruding part in a rotational direction of the rotation axis, and connected to the connection region; and
a third flute located ahead of the elongated protruding part in the rotational direction and separated from the connection region.

12. A drill, comprising:
a bar-shaped drill body extending along a rotation axis;

a cutting edge located at a front end of the drill body; and
a first flute extending spirally from the cutting edge toward a rear end of the drill body,
wherein the first flute comprises:
   a first region which is located close to the front end and has a first helix angle;
   a second region which is located closer to the rear end than the first region and has a second helix angle smaller than the first helix angle;
   a connection region located between the first region and the second region and connected to the first region and the second region; and
   an elongated protruding part that is located on the second region, is separated from the first region and is separated from the connection region.

\* \* \* \* \*